No. 609,738. Patented Aug. 23, 1898.
F. R. EMMITT.
COUPLING.
(Application filed May 17, 1897. Renewed July 28, 1898.)
(No Model.) 2 Sheets—Sheet 1.
Fig. 1.
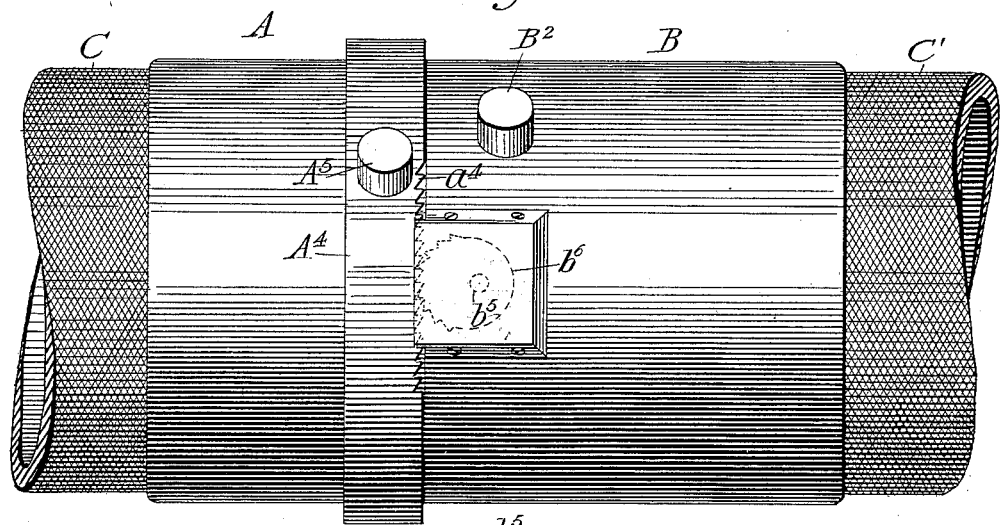
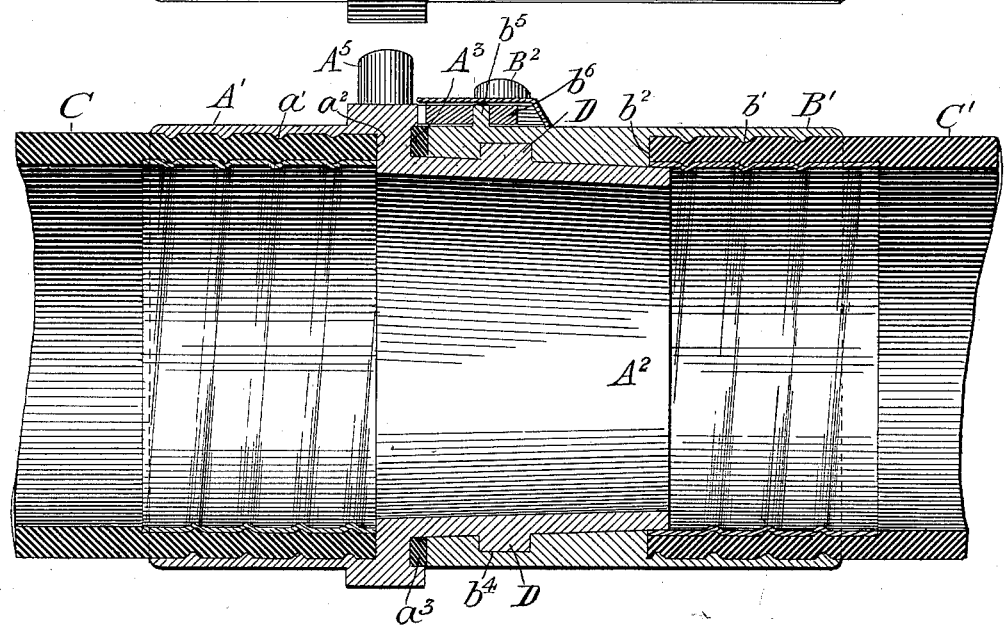
Fig. 2.
Witnesses:
L. M. Marble
N. Wetterling
Inventor:
Floyd R. Emmitt
By E. M. Marble & Sons
His Attorneys

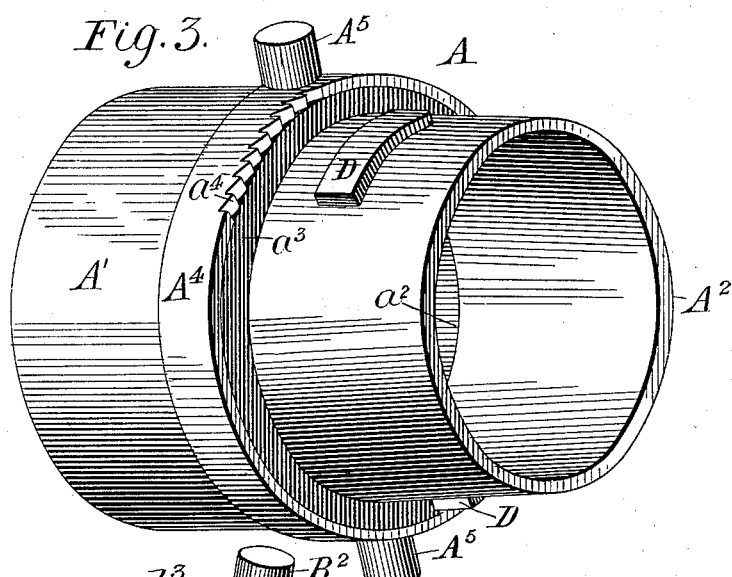
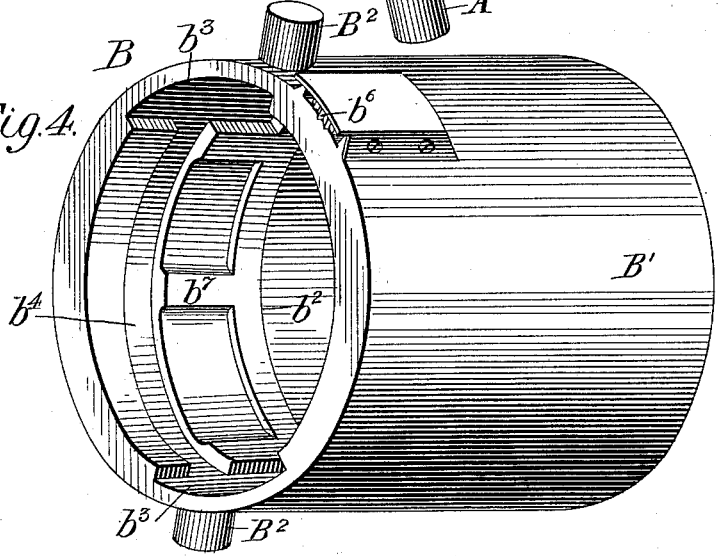
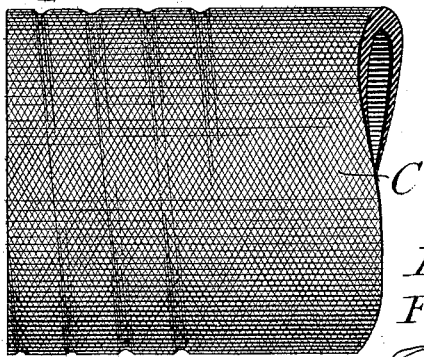

United States Patent Office.

FLOYD R. EMMITT, OF CHILLICOTHE, OHIO, ASSIGNOR TO CORNELIA H. EMMITT, OF SAME PLACE.

COUPLING.

SPECIFICATION forming part of Letters Patent No. 609,738, dated August 23, 1898.

Application filed May 17, 1897. Renewed July 28, 1898. Serial No. 687,112. (No model.)

*To all whom it may concern:*

Be it known that I, FLOYD R. EMMITT, a citizen of the United States, residing at Chillicothe, in the county of Ross and State of Ohio, have invented certain new and useful Improvements in Couplings; and I do hereby declare the following to be a full, clear, and exact description of the invention, such as will enable others skilled in the art to which it appertains to make and use the same.

My invention relates to improvements in couplings, and particularly to improvements in hose-couplings; and it consists in the novel hose-coupling the construction and arrangement of the parts of which will be hereinafter fully described, and particularly pointed out in the claims.

The objects of my invention are to simplify the construction of hose-couplings, to render the attachment of the two parts of the coupling more easy to effect and more sure in action, and to provide a novel means for securing the hose to the parts of the coupling.

In accomplishing the objects of my invention I make use of a hose-coupling in which the male and female parts of the coupling are secured together by the action of cam-shaped projections on the male portion of the coupling entering into grooves formed in the female portion of the coupling and in which the two parts are prevented from turning after having once been locked together by the engagement of teeth formed on a cam mounted on one portion with ratchet-teeth formed on the other portion.

The chief feature of my invention, however, consists in the manner in which I insure a water-tight junction between the male and female portions of the coupling and also between the end of the male portion of the coupling and the end of one section of the hose.

I provide for the water-tight connection of the male and female portions of the coupling by forming an annular ring around the male portion of the coupling at some distance from the end thereof, in which is formed a groove to receive a packing-ring. The position of the annular ring on the male portion of the coupling is such that when the parts are coupled together the end of the female portion of the coupling will enter the groove formed in the ring, and as the parts are closely joined together by the cam action of the coupling-pieces will be tightly pressed against the packing-ring, so as to prevent escape of water at this point.

I provide for the water-tight connection of the end of the male portion with the hose by slightly tapering the male portion of the coupling and also the portion of the female portion of the coupling through which the male portion passes, and by giving such length to the male portion of the coupling that when the parts are joined together the end of the male portion of the coupling will project into the end of the hose-section which has been introduced into the female portion of the coupling, and as the parts are tightly joined together by the cam action thereof will force the end of the hose so tightly against the inner surface of the female coupling by reason of the further entrance thereinto of the tapering male member that escape of water at this point is impossible.

I wish to call attention to the fact that joints necessary to be made in order to render the coupling water-tight are in every instance rendered more perfect and are completed by the same action which unites the parts of the coupling.

A further feature of my invention is the manner in which I secure the ends of the hose-sections to the portions of the coupling. This is accomplished by forming an interior screw-thread of low pitch at one end of the male or female portions of the coupling and by screwing the end of the hose into such portion of the coupling. The end of the hose is prevented from losing its form by a tube formed with threads of the same pitch as the threads formed on the interior of the coupling, which is inserted at the end thereof. The elasticity of the body of the hose is sufficient to enable it to be forced into the end of the hose-coupling in the manner described. A tight and secure connection between the hose and the hose-coupling is thus effected.

My invention is fully illustrated in the drawings which accompany and form a part of this specification, in which the same reference-letters refer to the same or corresponding parts, and in which—

Figure 1 is a view of a hose-coupling in position joining the ends of two sections of hose. Fig. 2 is a sectional view of the same. Fig. 3 is a detail perspective view of the male portion of the coupling. Fig. 4 is a corresponding view of the female portion of the coupling. Fig. 5 is a view of the end of a piece of hose which has been inserted into the interiorly-screw-threaded end of one of the portions of the coupling.

Referring to the drawings, A represents the male portion of the coupling. A part of both the male and the female portions of the couplings is designed to permit the attachment thereto of the ends C and C' of the sections of hose between which connection is to be effected. The outer ends A' and B' of both the male and female portions of the coupling are accordingly interiorly screw-threaded, as shown at $a'$ and $b'$, the screw-threads being stopped at both instances by the interior annular ring $a^2$ and $b^2$, which leaves an opening through the sections of hose-couplings corresponding to the interior bore of the pieces of hose which are to be connected. The ends of the hose-sections C and C' have inserted thereinto, for a short distance at the ends thereof, tubing of any suitable material, such as copper, formed with screw-threads of the same pitch as the screw-threads $a'$ and $b'$, which prevents the ends of the hose from losing their circular shape. Connection is effected between the ends of the pieces of hose and the ends of the hose-couplings by screwing the ends of the hose into the ends of the hose-couplings, the elasticity of the rubber hose being sufficient to allow it to be forced into and occupy the screw-threads formed in the male and female portions of the coupling.

When the ends of the hose are finally in position abutting against the annular rings $a^2$ and $b^2$, they are so firmly held that accidental removal of the same will be impossible, and especially in large-sized hose considerable force will have to be exerted to remove the hose from the hose-sections, should that ever be desirable.

If desired, an expander may be inserted to expand the inner tube. The portions of the hose entering into the screw-threads of the hose-couplings expand and resume very nearly their normal size, but the portions thereof which rest against the ridges or corrugations of the screw-threads are at all times considerably compressed and act to hinder any movement of the hose relative to the hose-coupling. The junction thus effected is sure and water-tight. The hose is not marred or injured in any way, nor is its durability impaired. The inner end of the male portion of the coupling is of considerably less diameter than the outer end of the same, as shown particularly in Fig. 3. It is this portion of the male portion of the coupling which is to enter into the female portion of the coupling, and it is designated in the drawings by the reference character $A^2$. The entering end $A^2$ is slightly tapered, as shown in the drawings, for a purpose which will hereinafter appear. On it, but at some distance from the end thereof, are formed cam-shaped lugs D, two of these being shown in the drawings, though the number may be changed, as desired.

At the point of meeting between the entering portion $A^2$ of the male portion of the coupling and the remainder thereof there is formed an annular groove $A^3$, whose width is slightly greater than the end of the female portion of the coupling. This is rendered possible by the annular ring $A^4$ formed at this point, on which ring are cast the lugs or projections $A^5$, by means of which the parts of the coupling may be firmly united together.

Within the annular groove $A^3$ is placed the packing-ring $a^3$, against which the end of the female portion of the coupling will abut in the operation of the device. On the edge of the ring $A^4$ are also formed ratchet-teeth $a^4$, the position of the teeth corresponding to the position of the lugs $A^5$, and the number of teeth employed being dependent upon the amount of turn which it is desired to give the two portions of the coupling in uniting the same together.

The female portion of the coupling B is tapered on its inner surface up to the point where the annular ring $a^2$ is formed, to correspond with the taper of the entering portion $A^2$ of the male portion of the coupling. Its inner surface is cut away at two points $b^3$ to permit the entrance into the coupling of the lugs D formed on the entering portion $A^2$.

At a distance within the female portion of the coupling corresponding to the distance between the lugs D and the packing-ring $a^3$ there is formed a cam-shaped or inclined groove $b^4$, which is sufficiently wide to accommodate the lugs D. The male and female portions of the coupling may thus be joined together by holding the parts in such a position as to permit the lugs D to pass through the cut-away portions $b^3$ of the female portion of the coupling and by then turning the parts upon each other until by the action of the cam-shaped groove $b^4$ and the lugs D the parts are as securely joined together as possible, the end of the female portion of the coupling being pressed tightly against the packing-ring $a^3$. To hold the parts in this position, I have journaled upon the pin $b^5$, projecting from the outer surface of the female portion of the coupling, an eccentrically-mounted cam-shaped disk $b^6$. The disk $b^6$ may be tightly fitted to its pivot, so that it will not readily change its position except when caused to do so by positive means. When the two members of the coupling are to be connected, the disk is placed with its shortest radii in the position where it will be first acted upon by the male member of the coupling. When in this position, it does not interfere with the preliminary fastening together of the two parts of the coupling. When the two parts are thus placed together, the teeth formed on the surface thereof engage with the ratchet-teeth $a^4$, formed on the annular ring $A^4$, so as to cause the cam-shaped disk $b^6$ to be rotated by the movement of the two portions of the coupling relative to each other.

By properly proportioning the surface of the cam-shaped disk $b^6$ the point at which the greatest binding action takes place may be made to correspond with the position which the parts are desired to bear relative to each other and to the maximum binding action of the lugs D within the grooves $b^4$. Lugs $B^2$, corresponding to the lugs $A^5$, are formed in the female portion of the coupling, so as to render it possible to easily exert the force required to fasten the two parts of the coupling together.

I have stated that the entering portion $A^2$ of the male portion of the coupling is tapered or inclined and that the portion of the female part of the coupling through which such entering portion passes is correspondingly inclined. The effect of this is to make it possible to easily insert the entering end $A^2$ of the male portion of the coupling into the female portion of the coupling.

Ribs $b^7$ on the inner surface of the female portion of the coupling serve to guide the entering portion $A^2$ of the male portion of the coupling, so as to render its entrance into the female portion of the coupling easy and to prevent any hitch at any point. When in position within the female portion of the coupling and before the two portions of the coupling have been turned relative to each other, the end of the entering portion $A^2$ slightly projects into the end of the section of hose which has been joined to the female portion of the coupling in the manner hereinbefore set forth. This would insure a water-tight junction between the ends of the entering portion $A^2$ and the end of the hose; but to still further insure a water-tight junction and to bind the end of the hose more securely against the inner surface of the portion of the coupling to which it is attached when the movement of the portions of the coupling relative to each other takes place the tapering end of the entering portion $A^2$ is still farther forced within the hose-section, thus tightly securing all parts in proper position.

I wish to lay particular emphasis upon the fact that the final water-tight connection between not only the male and female portions of the coupling at the packing-ring $a^3$, but also the end of the entering portion $A^2$ and the end of the hose-section, is effected by the same action and at the same time that the male and female portions of the coupling are firmly united together. The construction is very simple, but it is efficient and renders it possible for any one to perform the action of coupling the ends of the two sections of hose without the exertion of extraordinary force and without any previous acquaintance with the coupling. There is here nothing which is liable to get out of order or to become displaced. The hose-coupling can be applied in an instant, and as all the parts are interchangeable for the same size of hose the ends of any two sections of hose provided with male and female portions of my coupling can be united instantly and effectually.

To uncouple my coupling, it is only necessary to reverse the direction of rotation of the parts of the coupling till the position of the lugs D correspond to the position of the cutaway portions $b^3$, when the parts of the coupling may be readily disconnected.

I do not restrict my invention to the coupling together of hose-sections, as it may be used with equal applicability in the coupling together of pipe-sections, or in coupling together the two portions of the nozzle used to direct a stream of water, or in connecting together plugs or hydrants; but

What I claim as new, and desire to secure by Letters Patent, is—

1. In a coupling, the combination with a male member having a tapered end, and a female member having one end adapted to receive said tapered end, and having the end of a section of hose secured to its other end, the length and size of said tapering portion being such that it will enter and fit tightly within the end of said hose-section, of a cam connection between said male and female members, whereby in the act of connecting them they are forced more tightly together and the tapered end forced farther into the end of the section of hose, substantially as described.

2. In a coupling, the combination with a male member having a tapered end, and having an annular grooved ring at the commencement of the tapered portion, packing in said grooved ring, and a female member having one end adapted to receive said tapered end, and having the end of a section of hose secured to its other end, the length and size of said tapered portion being such that it will enter and fit tightly within the end of said hose-section, and the end of the female member being adapted to contact with the packing in said grooved ring, of cam connection between said male and female members, whereby in the act of connecting them they are forced more closely together and a tighter junction of all joints secured, substantially as described.

3. In a coupling, the combination with a male member having a tapered end, and a female member having one end correspondingly tapered to receive such tapered end, and having the end of a section of hose secured to its other end, the length and size of said tapered end being such that it will enter and fit tightly within the end of said hose-section, said female member having an interior annular ring against which said hose-section is adapted to abut, and having inclined guides to guide said tapered end, of means for securing together said male and female sections, substantially as described.

4. In a coupling, the combination with a male member having a tapered end, an annular grooved ring at the commencement of the tapered portion, and packing in said grooved ring, and a female member having one end adapted to receive said tapered end, and having the end of a section of hose secured to its other end, the length and size of said tapered end being such that it will enter and fit tightly within the end of said hose-section, and the end of the female member being adapted to contact with the packing in said grooved ring, said female member having an interior annular ring of the thickness of said hose-section against which said hose-section is adapted to abut and having interior guides to guide said tapered end, of cam connection between said male and female members, whereby in the act of connecting them they are forced more closely together and a tighter junction of all joints secured, substantially as described.

5. In a coupling, the combination with a male member having a tapered end, and a female member having one end adapted to receive said tapered end, and having the end of a section of hose secured to its other end, the length and size of said tapered portion being such that it will enter and fit tightly within the end of said hose-section, of the lugs D formed on said male portion, and the cut-away portions $b^3$ and cam-grooves $b^4$ formed on said female portion, whereby as the parts of the coupling are connected they are forced more tightly together and the tapered end forced farther into the end of the section of hose, substantially as described.

6. In a coupling, the combination with a male member having a tapered end, and having an annular grooved ring at the commencement of the tapered portion, packing in said grooved ring, and a female member having one end adapted to receive said tapered end, and having the end of a section of hose secured to its other end, the length and size of said tapered portion being such that it will enter and fit tightly within the end of said hose-section, and the end of the female member being adapted to contact with the packing in said grooved ring, said female member having an interior annular ring of the thickness of said hose-section against which said hose-section is adapted to abut and having interior guides to guide said tapered end, of the lugs D formed on said male portion, and the cut-away portions $b^3$ and cam-grooves $b^4$ formed on said female portion, whereby as the parts of the coupling are connected they are forced more tightly together and the tapered end forced farther into the end of the section of hose, substantially as described.

7. In a coupling, the combination with male and female portions and mechanism for connecting the same together, said mechanism being adapted to allow the turning of the hose-sections with relation to each other, of a projecting rim on one section, ratchet-teeth formed thereon, and a cam having a toothed periphery mounted on the other portion in meshing relation with said ratchet-teeth, whereby when the two sections are turned with relation to each other they are held in the position in which they remain when rotation ceases, substantially as described.

8. The combination with a section of coupling having screw-threads formed on the inner surface thereof, of a section of hose having a metal tube formed with screw-threads of the same pitch as those on the section of coupling inserted in the end thereof, whereby the end of said section of hose can be screwed into said hose-section and held therein, substantially as described.

In testimony whereof I affix my signature in presence of two witnesses.

FLOYD R. EMMITT.

Witnesses:
LOUIS M. MARBLE,
N. WETTERBURG.